METHOD FOR REPROCESSING MOLTEN FLUORIDE SALT REACTOR FUELS

Filed March 9, 1971 3 Sheets-Sheet 1

INVENTOR.
Marvin E. Whatley
BY
[signature]
ATTORNEY.

INVENTOR.
*Marvin E. Whatley*
BY
[signature]
ATTORNEY.

METHOD FOR REPROCESSING MOLTEN FLUORIDE SALT REACTOR FUELS

Filed March 9, 1971

INVENTOR.
Marvin E. Whatley

BY

[signature]
ATTORNEY.

3,677,719

METHOD FOR REPROCESSING MOLTEN FLUORIDE SALT REACTOR FUELS

Marvin E. Whatley, Oak Ridge, Tenn., assignor to the United States of America as represented by the United States Atomic Energy Commission

Filed Mar. 9, 1971, Ser. No. 122,402
Int. Cl. C22b *61/04*
U.S. Cl. 23—325 4 Claims

ABSTRACT OF THE DISCLOSURE

An improved method for reprocessing molten fluoride salt reactor fuels containing protactinium is provided comprising a dual temperature reductive extraction process using as an extractant molten bismuth containing a metal reductant. In the improved process the fuel values and the metal reductant are the only extractables.

BACKGROUND OF THE INVENTION

The invention described herein was made in the course of, or under, a contract with the United States Atomic Energy Commission. The present invention relates generally to methods for reprocessing nuclear reactor fuels and more particularly to a liquid-liquid reductive extraction method for reprocessing molten metal fluoride reactor salt mixtures of protactinium utilizing dual temperature extractors.

Extensive investigation of molten metallic fluoride reactor salt mixtures has demonstrated their suitability as nuclear core and blanket fluorides. Of recent interest is the use of these salt mixtures in a single fluid, double region molten salt breeder reactor which is described in Ser. No. 733,843, filed on June 3, 1968, in the names of Edward S. Bettis et al. for "Single Fluid Molten Salt Nuclear Breeder Reactor." In order that a molten salt reactor produce more fissile matter than is consumed, Pa-233 poduced therein must be removed from the region of nuclear flux during its decay to protect it from loss by neutron capture. A method for isolating protactinium by reductive extraction processes is disclosed in U.S. Pat. No. 3,472,633, issued to Leonard E. McNeese et al. That process comprises contacting a withdrawn side stream of the molten salt fuel with a molten metal solution, e.g., molten bismuth containing a stoichiometric amount of thorium and lithium metal reductant with respect to uranium, to provide reductive extraction of the uranium from the salt phase into the bismuth phase and to cause the protactinium values to be held up and concentrated within the extraction system by continuous reflux. Thereafter, the extracted uranium values are back extracted into the protactinium free molten salt solution prior to recycle to the reactor in an electrolytic oxidizer-reducer.

The metal reductant in this method is completely destroyed and subsequently regenerated in the electrolytic oxidizer-reducer, which is an expensive equipment item subject to serious operational upsets. While metal reductant may be added from an external source, this is undesirable from an economic standpoint.

SUMMARY OF THE INVENTION

It is an object of this invention to provide an improved method for reprocessing molten fluoride salt reactor fuels.

Another object is to provide a liquid-liquid reductive extraction reprocessing method for removing protactinium from molten salt reactor fuels without requiring addition or generation of large quantities of reductant.

These objects are achieved by the discovery that in a reductive extraction process for reprocessing molten salt reactor fuels of protactinium using as an extractant a molten bismuth solution containing a metal reductant the fuel values could be back extracted from the bismuth solution into the protactinium-free molten salt solution by contacting the molten salt solution and fuel-rich bismuth solution at a higher temperature than that used to isolate the protactinium values. In one embodiment where uranium is the fuel it is reduced from the tetravalent oxidation state to the trivalent oxidation state prior to entering the protactinium isolation unit and prior to recycle of the reprocessed molten salt solution to the reactor the trivalent uranium values are oxidized back to the tetravalent oxidation state. With such a dual temperature operation only uranium and lithium are extracted and the molten salt solution, which is recycled to the reactor, has the same composition as the withdrawn molten salt solution for reprocessing.

DESCRIPTION OF THE PREFERRED EMBODIMENT

Figure 1:
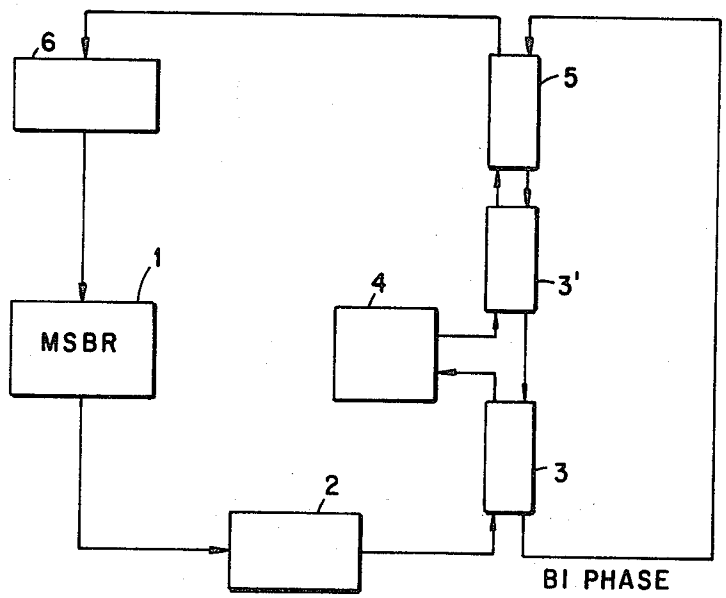
FIG. 1 is a flow diagram depicting an over-all reductive extraction process for isolating protactinium from molten fluoride salt reactor fuels using extractors at different temperatures.

The present invention will be described with particular reference to a reductive extraction process for isolating protactinium using dual temperature extractors as shown in FIG. 1. The reactor 1 may comprise a 1000 mw.(e) molten salt breeder reactor (salt core volume 1461 ft.$^3$) having a molten salt fuel composition of $LiF-BeF_2-ThF_4-UF_4-PaF_4$ (71.7–16.0–12.0–0.3–1.5$\times 10^{-7}$ mole percent). A portion of the molten fluoride salt reactor fuel (20 ft.$^3$/hr.) is withdrawn from the reactor and passed to a reduction vessel 2 wherein the tetravalent uranium is reduced to the trivalent oxidation state. This reduction step may be carried out by conventional means, such as by reducing the $UF_4$ to $UF_3$ with lithium or thorium metal reductant.

The effluent molten salt stream from the reductor containing uranium in the trivalent oxidation state is then processed to remove the protactinium values. For this the protactinium isolation unit described in U.S. Pat. 3,472,-633, supra, is quite suitable. This unit may comprise a pair of extractor vessels 3, 3' and a protactinium decay tank disposed intermediate to the two extractors. While the temperature of these extractors may vary over a range, it is desirable to operate at as low a temperature as practical, consistent with the requirement that inadvertent freezing of the salt be avoided. The extractors in the protactinium isolation unit can both be operated at a temperature of about 525° C. In the protactinium isolation unit the uranium is reduced in the lower extractor 3 to the metal state, extracted from the salt phase into the countercurrent flowing molten bismuth solution and is carried out of the bottom of extractor 3 in the exiting bismuth solution. As the molten salt proceeds up extractor 3 the protactinium values are reduced to the metal state and caused to reflux in the protactinium decay tank 4 by subsequent oxidation from the metal state to protactinium tetrafluoride. In this manner the effluent salt stream from the upper extractor 3' of the protactinium isolation unit is depleted in uranium and protactinium content.

In accordance with the present improvement the uranium-rich molten bismuth solution and effluent molten salt solution from the protactinium solution unit is passed to a separate liquid-liquid extractor 5 which is operated at a significantly higher temperature than the extractors used in the protactinium isolation unit. The performance of the system improves in principle as the temperature of extractor 5 increases, however, strength of structural members and the vapor pressure of the salt set a practicable upper limitation. It is preferred that extractor 5 be operated at a temperature of about 750° C.

It has been found that there is a temperature dependence upon the chemical equilibrium in a system wherein molten fluoride salt is contacted with a reductant metal in liquid bismuth. At higher temperatures, a larger fraction of the heavier metals (i.e., uranium or plutonium), takes the salt form, thus dissolving in the salt phase. In like manner, an equivalent amount of metal reductant (i.e., lithium) from the salt phase transfer to the molten metal phase at higher temperatures. This change in relative distribution with temperature can be exploited so that no addition of reductant is required and the operational disadvantages of the electrolytic oxidizer-reducer are avoided.

Each of the extractors 3, 3', 5, preferably, is a multistage, countercurrent device wherein concentration gradients of the extractables are established. Throughout a range of flow rates at steady state conditions, the uranium in extractor 5 transfers from the bismuth phase to the salt phase in exchange for lithium, the exchange being limited by the increase of lithium content in the metal phase and a resulting increase of uranium distribution coefficients. In the lower stages of extractor 5 the uranium concentration in the salt phase decreases to a comparatively low value, of the order of 20% less than the entering concentration. The lithium concentration in the metal, however, may be increased by a factor of 10.

The uranium, being the most noble component, circulates with the bismuth phase, providing the lithium for extraction by the shift in its distribution coefficient. Thorium establishes a concentration profile in the system much like that of lithium and those components which are of lower concentration in the salt and are comparable to thorium in activity tend to follow the salt with little change in concentration. Protactinium, being of intermediate nobility, enters the system at low concenrtation in the salt phase and tends to concentrate in the decay tank 4 which is disposed intermediate to the two extractors 3, 3' of the protactinium isolation unit.

Figure 2:
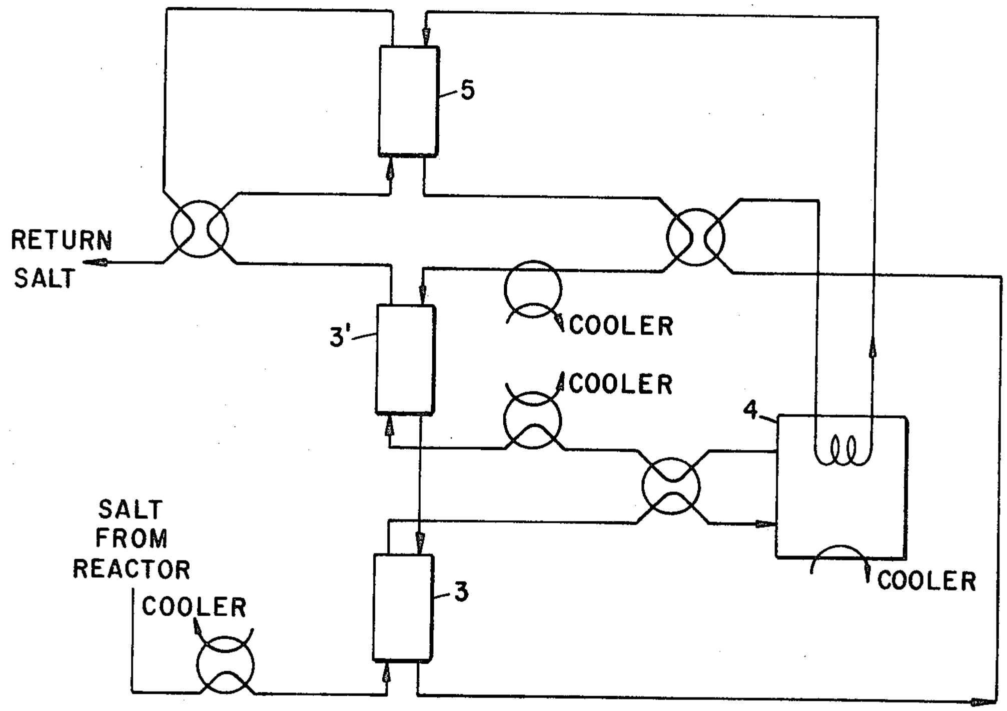
FIG. 2 is a flow diagram depicting an illustrated embodiment of the present improvement using decay heat to drive a dual temperature protactinium isolation process.

Advantageously the heat requirements of the present improved dual temperature process may be provided by utilizing the heat generated in the protactinium decay tank at steady state. To heat both the molten salt solution and the molten bismuth solution from the temperature of extractors 3, 3' operating in the protactinium isolation unit at about 525° C. to the higher temperature (750° C.) at which extractor 5 is operated requires, for an optimum metal-to-salt ratio (molar) of 7.59, $2.2\times10^6$ B.t.u./hr. (or 649 kw.). Since 4 mw. of heat is generated in the protactinium decay tank at steady state, the generated heat is quite suitable for meeting the heat requirements of operating the dual temperature extraction process. A flow diagram of the over-all process shown in FIG. 1 in which decay heat is used to drive the dual temperature isolation process is shown in FIG. 2.

After the uranium has been back extracted into the purified molten salt solution, the molten salt solution is next passed to an oxidizer vessel 6 wherein the trivalent uranium (as $UF_3$) is oxidized to the tetravalent oxidation state (i.e., $UF_4$). This may conveniently be accomplished by contacting the molten salt solution with hydrogen fluoride gas using about .003 mole of gas per mole of salt (1350 lbs. of HF/hr. typically) and at any temperature comfortably above the liquidus. The molten salt solution which is essentially free of protactinium is then recycled back to the reactor 1.

Where it is desirable to remove the rare earths present in the withdrawal side stream of molten fluoride salt solution, this may be conveniently achieved by withdrawing a side stream (not shown) of the salt effluent as it leaves the upper extractor 3' of the protactinium isolation unit. The effluent salt stream from extractor 3' is substantially depleted of uranium and protactinium values and is suitable as a feed stream to a rare earth removal system such as described in the aforementioned patent application.

Having described the invention in a general fashion the following examples are given to illustrate the improved dual temperature protactinium isolation process.

Example I

A molten metal fluoride salt reactor fuel having the composition 71.7–16.0–12.0–0.3–$1.5\times10^{-7}$ mole percent $LiBeF_2$-$ThF_4$-$UF_4$-$PaF_4$ is withdrawn from a 1000 mw.(e) single fluid, double region molten salt breeder reactor (salt volume 1461 ft.$^3$) at a rate of 487 ft.$^3$/day. The protactinium is generated in the reactor at the rate of 11.2 g. mole/day, and the reactor fuel is reprocessed on a three-day cycle. The withdrawn salt solution is passed to a reducer where the tetravalent uranium is reduced to the trivalent oxidation state by contacting the molten salt solution with 474 lbs./hr. of lithium metal reductant.

A protactinium isolation unit comprising a pair of liquid-liquid extractors and a protactinium decay tank (ratio of volume to reactor volume is 0.16) intermediate to the extractors is utilized to isolate the protactinium from the molten metal fluoride salt solution. The molten salt solution is passed from the reducer to the lower extractor of the protactinium isolation unit. This extractor has 4 equilibrium stages and is operated at a temperature of 525° C. The molten salt solution (20.3 ft.$^3$/hr.) is contacted countercurrently with a downflowing molten bismuth solution (185.6 ft.$^3$/hr.) containing 0.0105 equivalent of reductant per mole of bismuth.

The upper extractor of the protactinium isolation unit which is also operated at a temperature of 525° C. has 3 equilibrium stages. In this extractor the effluent salt (20.3 ft.$^3$/hr.) depleted in protactinium and uranium is contacted with downflowing molten bismuth solution (185.6 ft.$^3$/hr.).

The effluent salt from the upper extractor of the protactinium isolation unit is next passed to a separate liquid-liquid extractor. This extractor has 3 equilibrium stages and is operated at a temperature of 750° C. In this extractor the upflowing salt solution is contacted with a molten bismuth solution (185.6 ft.$^3$/hr.) which is recycled from the lower extractor of the protactinium isolation unit. At the higher temperature the uranium present in the recycled molten bismuth solution transfers back into the molten salt phase.

Thereafter the molten salt solution containing the uranium, which is in the trivalent oxidation state, is passed into an oxidizer vessel and oxidized to the tetravalent oxidation state by contacting the molten salt solution with hydrogen fluoride gas (1350 lbs./hr.) at 550° C. The molten metal fluoride salt solution which is essentially free of protactinium is finally passed back to the reactor.

Figure 3:
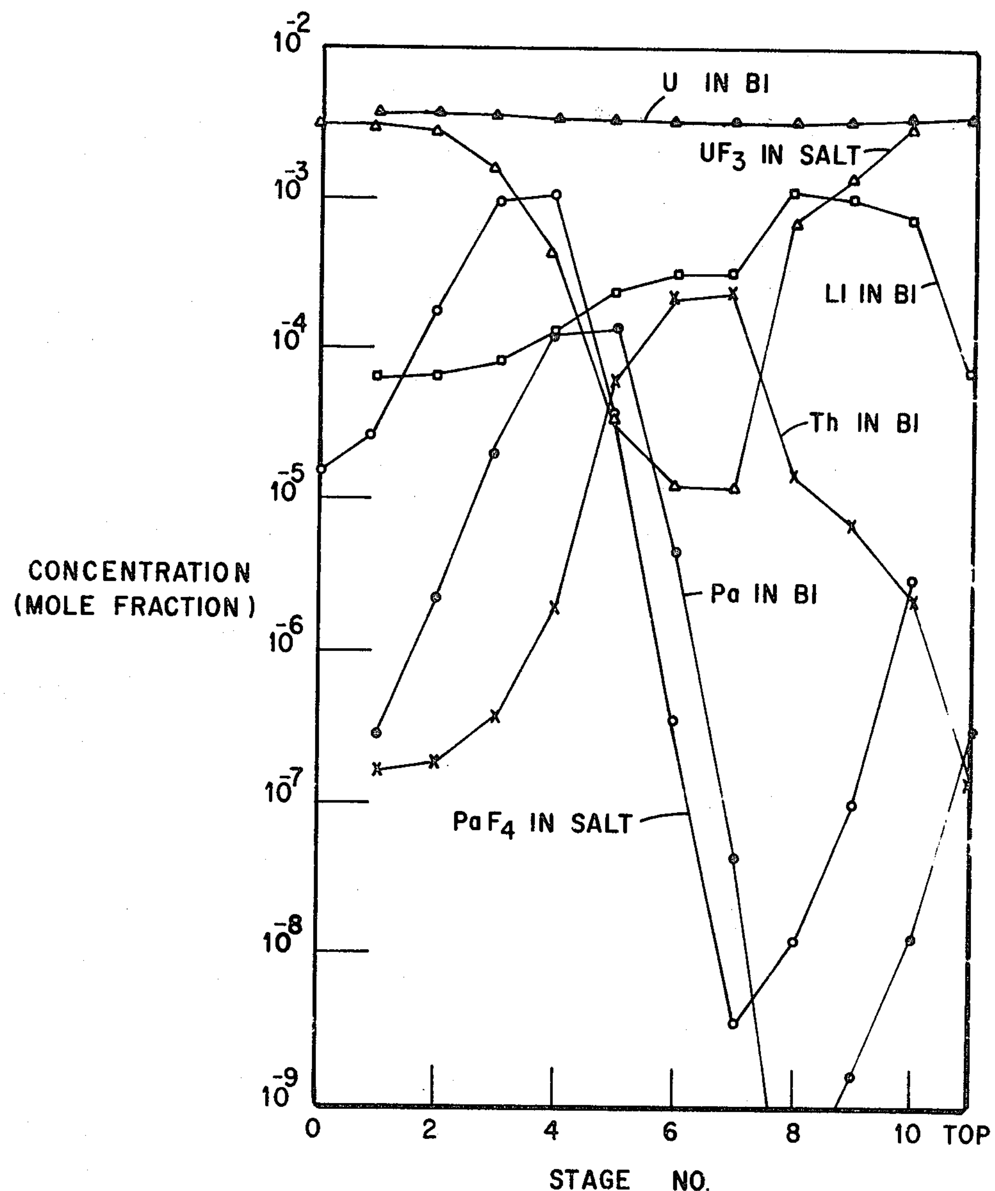
FIG. 3 is a concentration profile for the operation of one embodiment of a dual temperature protactinium isolation extraction cascade.

FIG. 3 shows a concentration profile which has an optimum metal-to-salt ratio (molar) of 7.59 for this system. It will be noted that the uranium concentration in the molten bismuth phase is reasonably uniform, decreasing only a few percent in the vicinity of stage 7. In the extractor which is operated at the higher temperature the lithium concentration in the bismuth phase increases as it comes down from the top to stage 8. The thorium concentration in the bismuth phase is very low but increases with the lithium concentration. At the top of the upper extractor of the protactinium isolation unit both the lithium and thorium are fairly high in concentration in the bismuth phase. As the bismuth solution progresses down the cascade through the extractors of the protactinium isolation unit the lithium concentration decreases by one order of magnitude, and the thorium concentration decreases by over three orders of magnitude; the thorium and lithium concentrations in the molten salt solution are not significantly affected. The lithium concentration in the bismuth phase is an index to the distribution coefficients for all of the heavy metals. Its gradient through the cascade signifies changes in the distribution coefficients of those metals, importantly including uranium and protactinium.

The product of the distribution coefficient of a component times the metal-to-salt flow rate is called its extraction factor. When the extraction factor of a component is greater than unity it is moving in the direction of metal flow and when it is less than unity it is moving in the direction of the salt flow. The extraction factor for uranium favors the metal phase through all of the extractors in the protactinium isolation unit, increasing from about one at the bottom of the lower extractor to about 100, near the top of the upper extractor. The extraction factor for protactinium, however, changes from less than one for stages 1, 2 and 3 in the lower extractor to greater than one for stages 5, 6 and 7 in the upper extractor. This results in the accumulation of protactinium in the decay tank at stage 4. A very low concentration of protactinium in the salt solution goes from the upper extractor to the separate extractor which is operated at the higher temperature and the protactinium concentration increases as the salt reclaims the protactinium introduced to the separate extractor in the bismuth stream.

Figure 4:
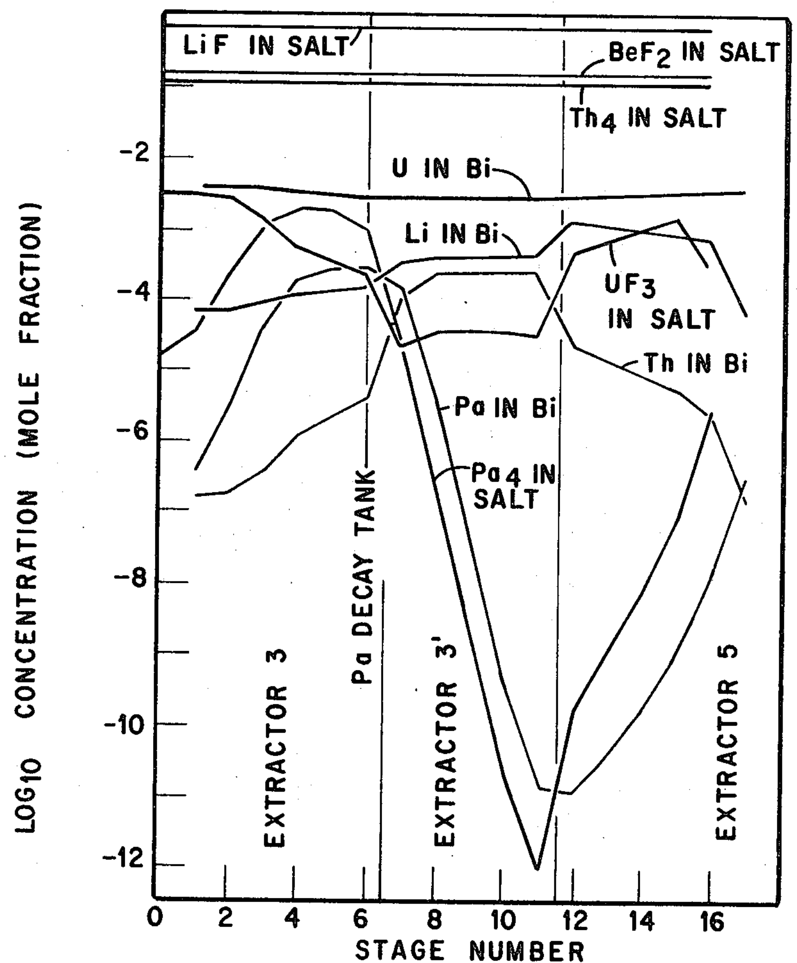
FIG. 4 is a concentration profile for an alternative dual temperature protactinium isolation extraction cascade.

The effect of relative bismuth flow rate on the concentration of protactinium in the decay tank, in the reactor and in the return salt solution is shown in FIG. 4. The performance of this system with respect to bismuth flow rate is very similar to the performance of the protactinium isolation system which uses an electrolyzer.

Example II

A second dual temperature protactinium isolation process is carried out as generally described in Example I, with the exception that the lower extractor has 6 equilibrium stages, the upper extractor in the protactinium isolation unit has 5 equilibrium stages and the separate higher temperature operated extractor has 5 equilibrium stages. All of the operating conditions were the same as in Example I.

The concentration profile for this process is shown in FIG. 4. There was very little difference in the performance of these two systems. The ratio of the concentration of protactinium in the decay tank to the concentration of protactinium in the reactor was 70 in each system. The only significant difference was the optimum metal-to-salt molar flow ratio; it being 7.59 in Example I and 6.71 in this system.

It should be apparent that various modifications to the present improved process may be made by those skilled in the art without departing from the scope of the invention. For example, plutonium may be substituted for uranium as the fuel. Where plutonium is used instead of uranium, it would exist in the trivalent state and relieve most of the requirements of the reduction operation whereby tetravalent uranium is reduced to the trivalent oxidation state.

What is claimed is:

1. In a method for reprocessing molten fluoride salt reactor fuels containing protactinium wherein the fuel values are reductively extracted in a protactinium isolation unit into a molten bismuth solution, said protactinium is held up and concentrated within said unit and said extracted fuel values are subsequently back extracted into the resultant protactinium-free molten salt solution, the improvement which comprises contacting the effluent molten salt solution of said protactinium unit with the fuel-rich molten bismuth solution at a higher tempertaure than that of said protactinium unit to back extract said fuel values from said molten bismuth solution into said protactinium-free molten salt solution.

2. The method of claim 1 wherein said fuel values comprise plutonium.

3. The method of claim 1 wherein said fuel values comprise uranium in the trivalent oxidation state.

4. The method of claim 1 wherein said protactinium isolation unit is operated at a temperatures of about 525° C. and said contacting step is conducted at a temperature of about 750° C.

References Cited

UNITED STATES PATENTS

| | | | |
|---|---|---|---|
| 3,326,673 | 6/1967 | Knighton et al. | 23—325 X |
| 3,472,633 | 10/1969 | McNeese et al. | 23—325 |
| 3,473,897 | 10/1969 | Shaffer et al. | 23—325 |
| 3,577,225 | 5/1971 | Shaffer et al. | 23—325 |

OTHER REFERENCES

Bareis et al., Nucleonics, 12, No. 7, pp. 16–19 (1954).

CARL D. QUARFORTH, Primary Examiner

E. A. MILLER, Assistant Examiner

U.S. Cl. X.R.

23—344 352